United States Patent
Chardon et al.

(10) Patent No.: US 8,228,377 B2
(45) Date of Patent: Jul. 24, 2012

(54) PAN AND TILT CAMERA

(75) Inventors: Jean-Michel Chardon, Livermore, CA (US); Howard Miyamura, Newark, CA (US); Arkadiy Roberov, South San Francisco, CA (US); Ali Moayer, Castro Valley, CA (US); Paul McAlpine, Fremont, CA (US); Patrick Miauton, Mountain View, CA (US); Remy Zimmermann, Belmont, CA (US)

(73) Assignee: Logitech Europe S.A., Morges (CH)

( * ) Notice: Subject to any disclaimer, the term of this patent is extended or adjusted under 35 U.S.C. 154(b) by 1028 days.

(21) Appl. No.: 10/871,139

(22) Filed: Jun. 18, 2004

(65) Prior Publication Data
US 2005/0057656 A1 Mar. 17, 2005

Related U.S. Application Data

(60) Provisional application No. 60/502,381, filed on Sep. 12, 2003.

(51) Int. Cl.
H04N 7/18 (2006.01)
(52) U.S. Cl. .................... 348/143; 348/155
(58) Field of Classification Search .............. 348/357, 348/169, 143, 155; 396/133
See application file for complete search history.

(56) References Cited

U.S. PATENT DOCUMENTS

| | | | |
|---|---|---|---|
| 4,348,097 A | 9/1982 | Sippel | |
| 4,980,871 A * | 12/1990 | Sieber et al. | 367/127 |
| 5,057,859 A * | 10/1991 | Ishimaru | 396/49 |
| 5,239,330 A * | 8/1993 | Uenaka | 396/95 |
| 5,298,933 A * | 3/1994 | Chigira | 396/82 |
| 5,334,917 A * | 8/1994 | Lind | 318/400.35 |
| 5,389,967 A | 2/1995 | Kim | |
| 5,572,317 A * | 11/1996 | Parker et al. | 356/139.06 |
| 5,598,209 A | 1/1997 | Cortjens et al. | |
| 5,614,982 A * | 3/1997 | Yasukawa | 396/95 |
| 5,627,616 A * | 5/1997 | Sergeant et al. | 396/427 |
| 5,652,928 A * | 7/1997 | Baxter et al. | 396/136 |
| 5,754,225 A * | 5/1998 | Naganuma | 348/155 |
| 5,802,412 A * | 9/1998 | Kahn | 396/427 |
| 5,864,363 A | 1/1999 | Giefing et al. | |
| 5,893,651 A * | 4/1999 | Sakamoto | 396/86 |

(Continued)

FOREIGN PATENT DOCUMENTS

CN 1254904 5/2000
(Continued)

OTHER PUBLICATIONS

"Logitech QuickCam Sphere Stands Above the Crowd, Follows Every Move with Mechanical Pan and Tilt," Press Release, Logitech, Oct. 31, 2003, searched on the internet Feb. 6, 2009, http://www.logitech.com/index.cfm/172/1705&cl=roeu,en. Non-Final Office Action for U.S. Appl. No. 10/956,737 mailed on Apr. 27, 2010; 9 pages.

*Primary Examiner* — Albert Cutler
(74) *Attorney, Agent, or Firm* — Kilpatrick Townsend & Stockton LLP

(57) ABSTRACT

A camera comprises a camera support; a camera housing rotatably disposed on the camera support for pan movement relative to the camera support; a camera lens rotatably disposed in the camera housing for tilt movement relative to the camera housing; a pan motor coupled with the camera housing to drive the camera housing in pan movement relative to the camera support; and a tilt motor coupled with the camera lens to drive the camera lens in tilt movement relative to the camera housing.

13 Claims, 7 Drawing Sheets

U.S. PATENT DOCUMENTS

| | | |
|---|---|---|
| 6,297,846 B1 | 10/2001 | Edanami |
| 6,593,956 B1 | 7/2003 | Potts et al. |
| 6,606,458 B2 | 8/2003 | Umeda et al. |
| 6,680,745 B2 | 1/2004 | Center et al. |
| 6,879,709 B2 | 4/2005 | Tian et al. |
| 7,473,040 B2 | 1/2009 | Kenoyer et al. |
| 2001/0007472 A1* | 7/2001 | Nishimura .................... 348/335 |
| 2002/0113862 A1 | 8/2002 | Center, Jr. et al. |
| 2002/0140308 A1* | 10/2002 | Inayama et al. ......... 310/156.47 |
| 2003/0133599 A1 | 7/2003 | Tian et al. |
| 2003/0163289 A1 | 8/2003 | Whelan et al. |
| 2005/0168574 A1 | 8/2005 | Lipton et al. |
| 2006/0075448 A1 | 4/2006 | McAlpine et al. |

FOREIGN PATENT DOCUMENTS

| | | |
|---|---|---|
| DE | 102004044151 A1 | 9/2004 |
| GB | 2343945 A | 5/2000 |
| JP | 58103891 A * | 6/1983 |
| WO | WO 99/60788 A1 | 11/1999 |

* cited by examiner

PAN AND TILT CAMERA

CROSS-REFERENCES TO RELATED APPLICATIONS

The application is based on and claims the benefit of U.S. Provisional Patent Application No. 60/502,381, filed Sep. 12, 2003.

BACKGROUND OF THE INVENTION

The present invention relates generally to cameras and, more particularly, to a mechanical pan and tilt camera for use with a computer or the like.

Video cameras for computers have become increasingly common. Various features and capabilities are being provided to improve the performance of such cameras to meet the needs of the users. For instance, it is desirable to provide camera movement and tracking without degrading the video and audio quality of the camera. Other considerations such as size, cost, and versatility may also be important.

BRIEF SUMMARY OF THE INVENTION

Embodiments of the present invention are directed to a camera having pan and tilt capabilities that provide good video and audio qualities in a cost-effective manner. In specific embodiments, the camera employs a microcontroller-based motor drive and position sensing system that eliminates the need for position encoders and travel limit switches. Instead, the system utilizes DC motors for pan and tilt movement with back EMF and brush noise sensing, time and frequency signal processing filters, an electronic brake system for stopping the pan and tilt mechanism without overshooting or slipping, and software/firmware-based end-of-travel detection. The motor drive system uses a fail-safe constant current regulation circuit to prevent overloading or overheating. The motor power and speed are regulated independently of the motor winding and loading tolerances. Mechanical isolators and/or chambers having multiple layers of an absorption material may be used to reduce mechanical noise during pan and tilt movement of the camera, and to acoustically isolate the audio components from the motors. In some embodiments, the use of worm gears instead of spur gears for reduction between the motor and the camera can significantly lower the noise and vibration generated. The use of miniature DC motors provides low power operation and a compact assembly. The gearbox assembly may be made of plastic to reduce the weight. A modularized gearbox mechanism can be programmed by external mechanical features to work in both pan and tilt systems.

In accordance with an aspect of the present invention, a camera comprises a video module including a camera lens and an actuator configured to move the camera lens, and an audio module coupled with the video module. The audio module includes an audio component disposed in an audio housing configured to substantially insulate acoustically the audio component from the video module.

In some embodiments, the audio housing comprises a plurality of layers of different materials. The different materials include metals and nonmetals. The audio housing may comprise a shock absorption material. Mechanical isolators may be disposed between the audio housing and the video module.

In accordance with another aspect of the invention, a camera comprises a camera support; a camera housing rotatably disposed on the camera support for pan movement relative to the camera support; a camera lens rotatably disposed in the camera housing for tilt movement relative to the camera housing; a pan motor coupled with the camera housing to drive the camera housing in pan movement relative to the camera support; and a tilt motor coupled with the camera lens to drive the camera lens in tilt movement relative to the camera housing.

In some embodiments, a gear reduction mechanism is provided for at least one of the pan motor and the tilt motor. The gear reduction mechanism includes worm gears. The worm gears are used in a first stage of gear reduction. The camera housing has a range of pan movement relative to the camera support, and an end of travel in pan movement is detected if no signal is received from the pan motor for a preset period of time.

In accordance with another aspect of this invention, a camera comprises a camera lens; a DC motor coupled with the camera lens to move the camera lens; and a back EMF encoder coupled with the DC motor to receive a signal from the DC motor and to detect a position of the DC motor based on a number of transitions of the received signal.

In some embodiments, the back EMF encoder comprises an amplifier and filter to amplify and filter a signal received from the motor; a comparator coupled with the back EMF encoder to detect the transitions based on the amplified and filtered signal; and a time domain filter. A pulse counter is configured to count a number of pulses corresponding to the transitions to produce position data of the DC motor.

In accordance with another aspect of the present invention, a camera comprises a camera lens; a DC motor coupled with the camera lens to move the camera lens; a sensor configured to track a subject; and a controller coupled with the motor to control the motor and to the sensor to receive position information of the subject being tracked. The controller is configured to control movement of the motor based on the position information received from the sensor. The position information includes a target position at which the subject stops. The controller is configured to reverse a polarity of the DC motor before the camera lens reaches the target position to slow movement of the camera lens and avoid overshooting the target position.

In some embodiments, the controller is configured to reverse the polarity of the DC motor by a calibrated amount that ratiomatically follows the acceleration profile (e.g., at least about five pulses before the last pulse in specific examples) before the camera lens reaches the target position to avoid or minimize overshooting the target position. The sensor detects a degree of movement of the camera lens from a start position to the target position. The controller is configured to calculate a total number of pulses for the DC motor to move the camera lens from the start position to the target position. The controller includes a constant current control to regulate an energy supplied to the motor.

In accordance with another aspect of the present invention, a method of operating a camera comprises moving a camera lens of a camera in pan movement to measure pan limit positions in pan movement; moving the camera lens in tilt movement to measure tilt limit positions in tilt movement; and automatically moving the camera lens to a home position with respect to the pan limit positions and the tilt limit positions upon initial start-up of the camera. In some embodiments, the home position is a reset position disposed at a center disposed substantially equidistant between the pan limit positions and substantially equidistant between the tilt limit positions. A user may set the home position.

In accordance with still another aspect of the invention, a method of operating a camera comprises determining a calibration offset for positioning a camera lens of a camera; storing the calibration offset; and using the calibration offset as a correction to control movement of the camera lens in pan and tilt to improve position accuracy of the camera lens. In some embodiments, the calibration offset is determined during manufacturing of the camera. The calibration offset may be determined with respect to the pan limit positions and tilt limit positions.

DETAILED DESCRIPTION OF THE INVENTION

Figure 1:
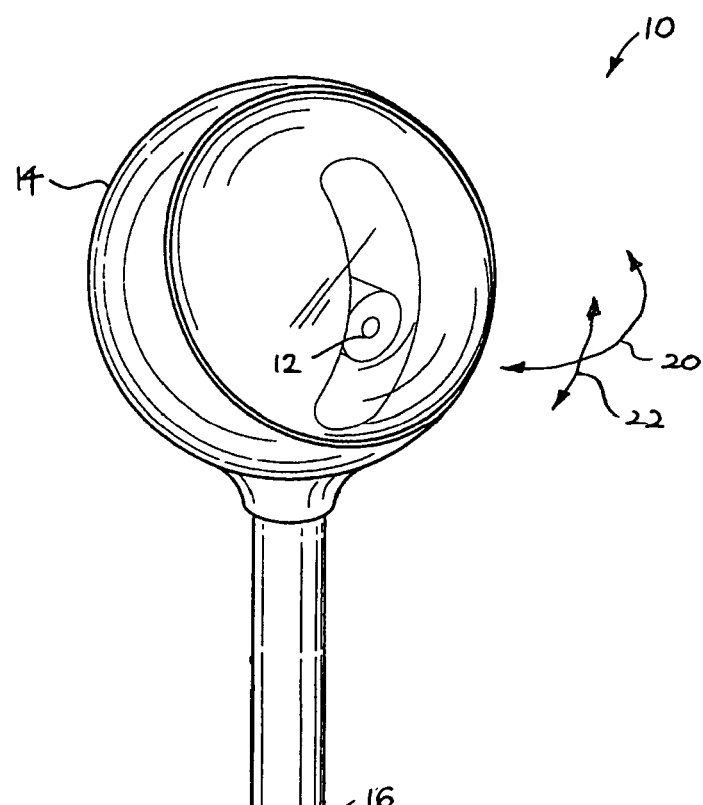
FIG. 1 is a perspective view of a pan and tilt camera having an elongated rod according to an embodiment of the present invention.
Figure 1:
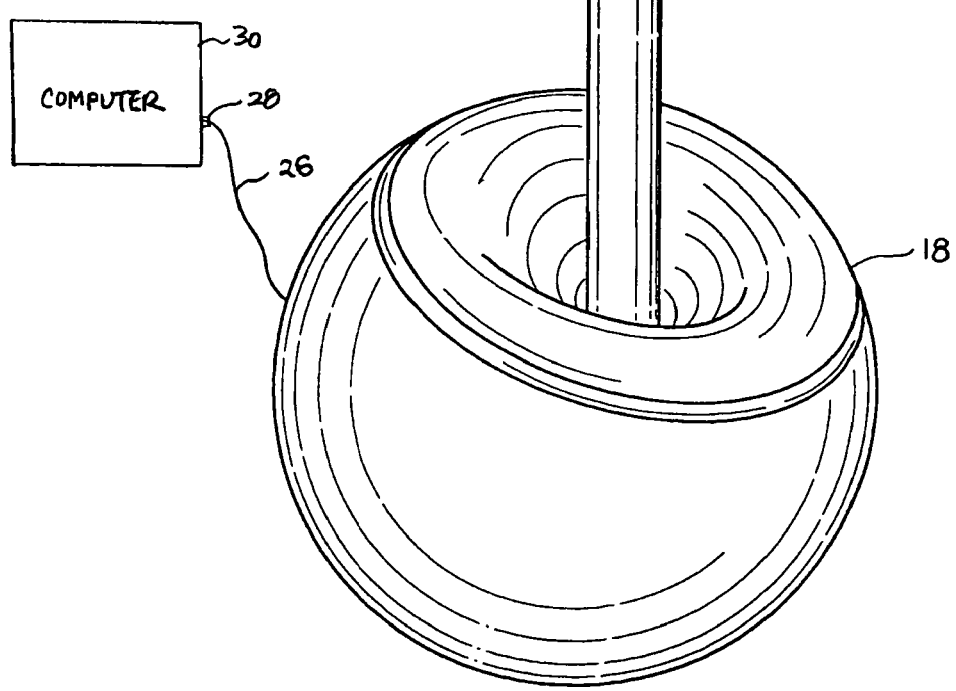

FIG. 1 shows a pan and tilt camera 10 having a lens 12 disposed in a camera head or housing 14. The housing 14 is rotatably connected to an elongated neck or shaft 16, which is supported on a camera base 18. The shaft 16 preferably is detachably connected between the housing 14 and the base 18. The shaft 16 may include a metal tube with a mesh shield to provide interference protection for EMI. The electrical connection between the shaft 16 and the base 18 may be a USB connection. The camera housing 14 rotates relative to the shaft 16 in the pan directions indicated by double arrows 20. The camera lens 12 rotates relative to the camera housing 14 in the tilt direction along double arrows 22. The camera housing 14 contains actuators for moving the camera lens 12 in tilt and the camera housing 14 in pan. The camera components in the camera housing 14 are connected electrically through the shaft 16 and base 18, via a line or cable 26 and a connector 28 to a host device 30 such as a computer 30, a set-top box, a media center, a game console, or the like. The connector 28 is desirably a USB connector. In the exemplary embodiment, the audio components such as a microphone are disposed in the base 18. The camera 10 and the host device 30 may each include a processor to perform processing, or the processing may be conducted in one of the two devices; information may be shared between the camera 10 and host device 30 to facilitate processing in one or both of the devices. For example, the camera 10 can detect positional information or the like and provide the information to the host device 30, which uses the information to control pan and tilt of the camera 10.

In other embodiments, the camera 10 and the computer 30 communicate wirelessly, and the line 26 is not needed. Further, the camera 10 may be connected directly to a network instead. In such cases, the camera 10 includes components to provide processing within to perform various tasks such as moving the camera in pan and tilt, tracking, and the like.

Figure 2:
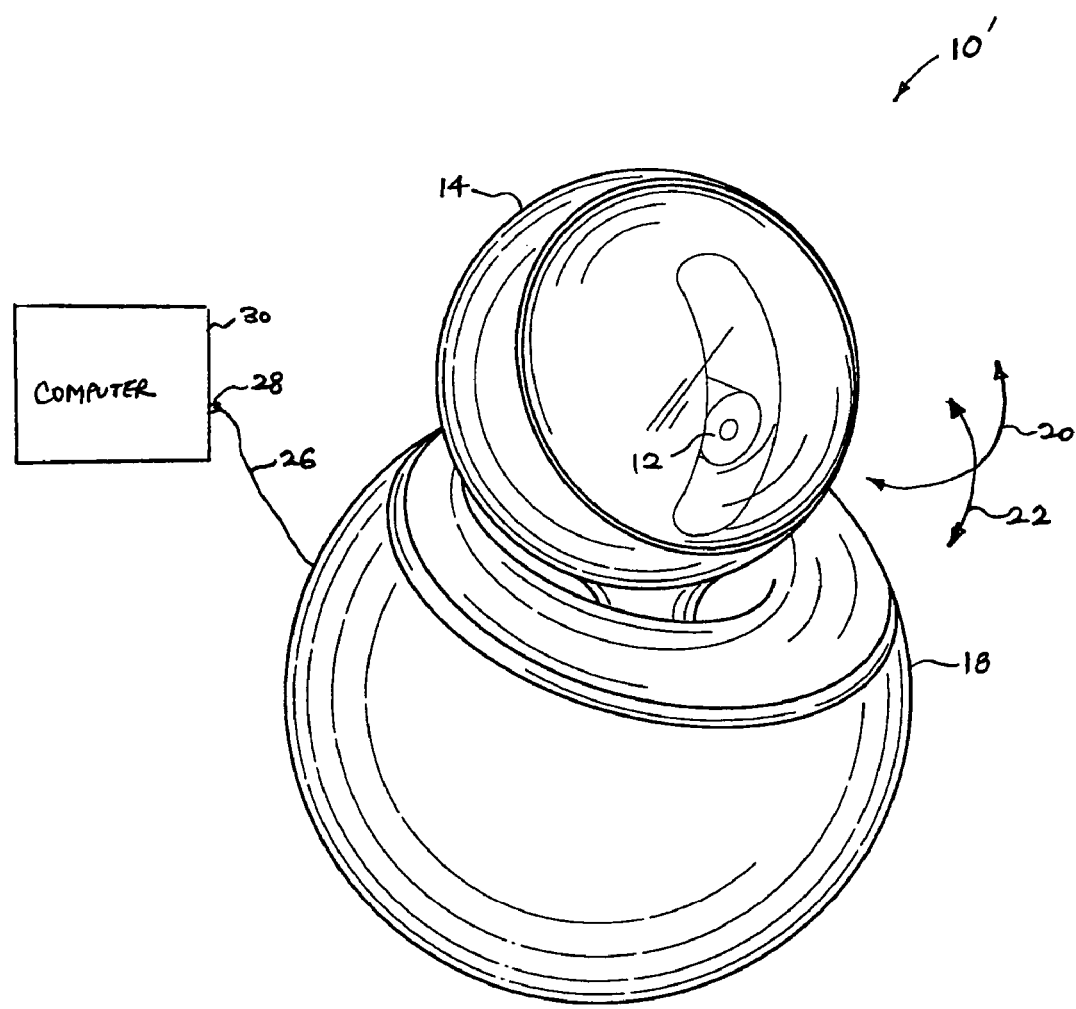
FIG. 2 is a perspective view of a pan and tilt camera without the elongated rod according to another embodiment of the invention.

In FIG. 2, the camera 10' is substantially the same as the camera 10 of FIG. 1, but without the elongated shaft 16. The camera lens 12 moves in tilt 22 relative to the camera housing 14, and the housing 14 moves in pan 20 relative to the base 18. The cable or line 26 connects the camera 10' to the computer 30 by a connector 28 which is desirably a USB connector.

Two actuators are used to produce separately the pan and tilt rotations of the camera. The actuators are disposed inside the camera housing 14. Electric motors are desirable because they are compact. In the exemplary embodiment, the actuators include DC motors which are less costly than step motors. A DC motor and a step motor have approximately the same volumetrics. The DC motor produces more torque, but lacks position control which may be compensated for by the use of position encoders, intelligent software control, or the like.

Figure 3:
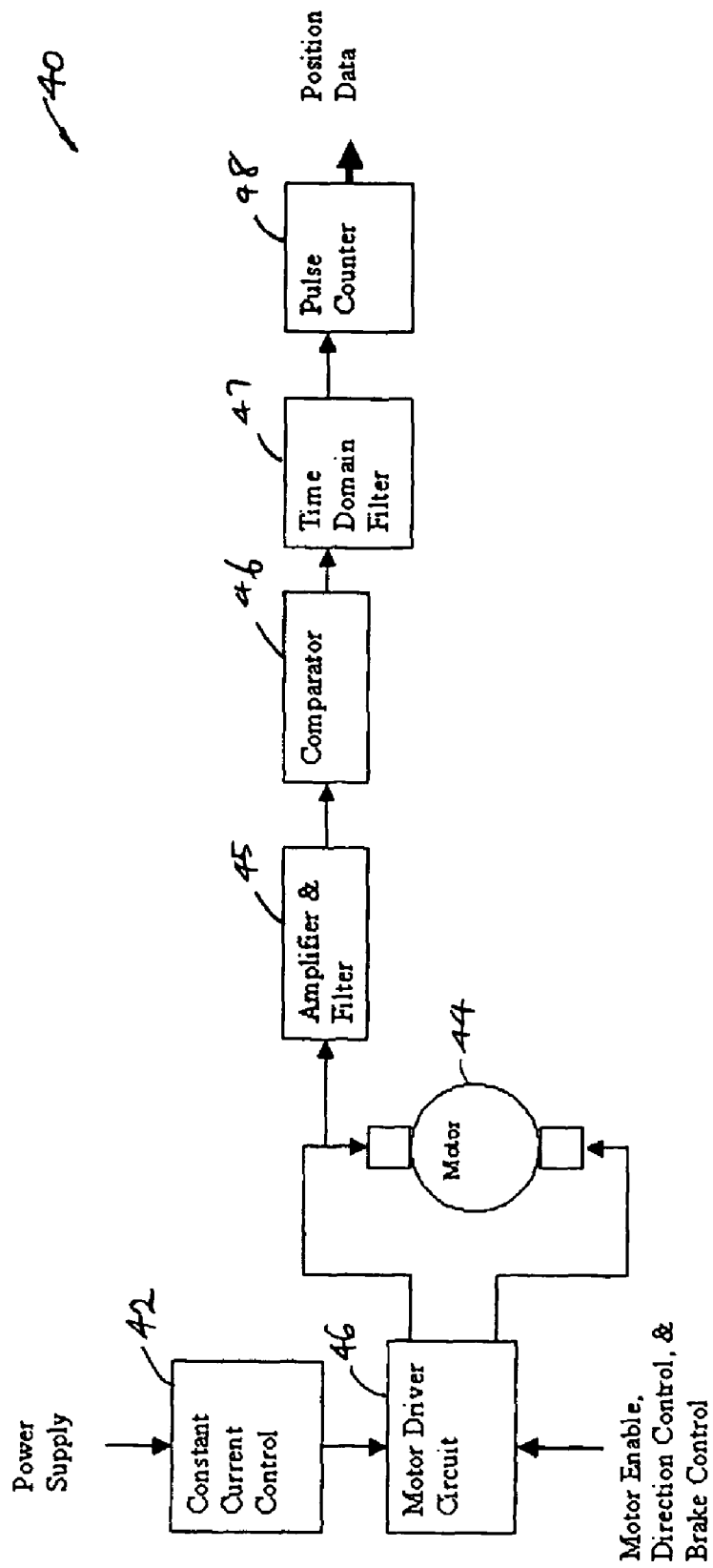
FIG. 3 is a block diagram of the system for controlling and driving a motor to produce pan or tilt movement of the camera.

FIG. 3 shows a system 40 for controlling and driving a motor to produce pan or tilt movement of the camera. Power is supplied to a constant current control 42 which regulates the energy amount supplied to the motor 44. Advantageously, the constant current control 42 will not allow excessive power into the motor 44 to avoid overheating or overloading, which may otherwise occur, for instance, if the panning movement of the camera housing 14 is interfered with by human intervention or other obstructions. A motor driver circuit 46 controls the motor activity such as direction and brake operation based on input for motor enable, direction control, and brake control. The motor 44 is preferably a DC motor.

Figure 4:
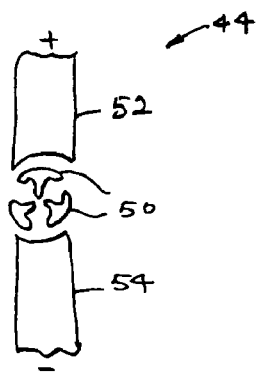
FIG. 4 is a simplified diagram of a DC motor according to an embodiment of the invention.
Figure 5:
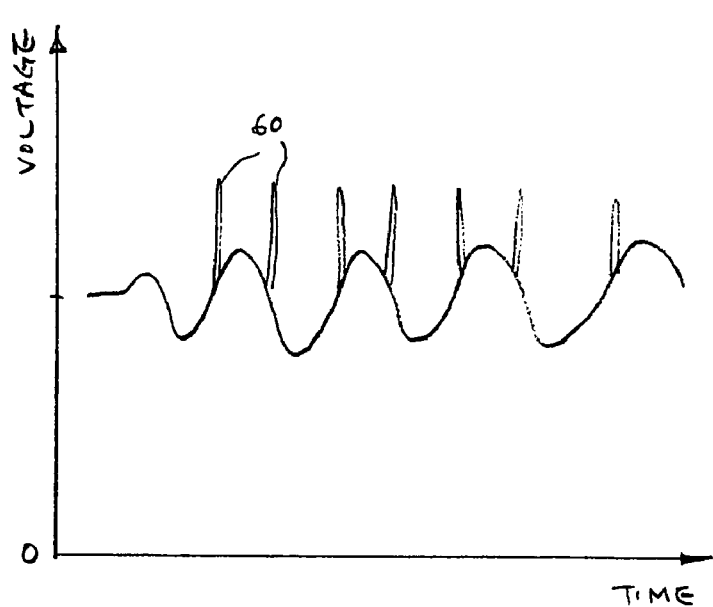
FIG. 5 is a graph illustrating the use of signals generated by the DC motor to determine position without the use of a position encoder according to one embodiment.
Figure 6:
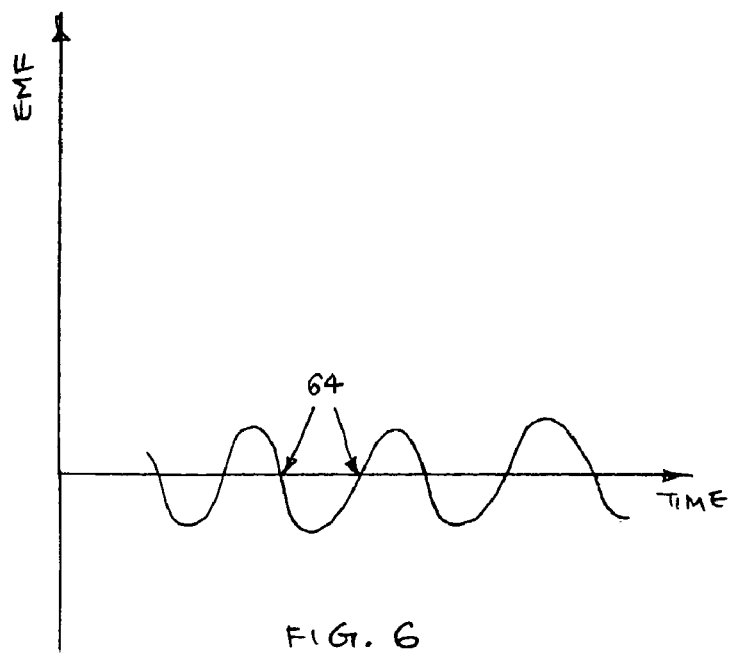
FIG. 6 is a graph illustrating the use of signals generated by the DC motor to determine position without the use of a position encoder according to another embodiment.

A typical DC brushed motor includes rotor, commutator, brushes, rotating shaft and bearings, and stator with permanent magnets. FIG. 4 shows a simplified view of a DC motor 44 including a plurality of rotors 50 disposed between stators 52, 54. For the three rotors 50, every revolution of the motor represents three windings with two collectors per winding. There are six transitions per revolution. The brush noise of the motor 44 produces a signal for each transition. Thus, there are six signals generated for each revolution of the rotors 50. The signals are seen as spikes 60 in the graph of voltage versus time in FIG. 5. By counting the number of the signals 60 or pulses, the position of the motor 44 can be ascertained without the use of a position encoder. In FIG. 6, the position of the motor 44 is determined by detecting the transitions 64 of a back EMF encoder for modulating the power voltage supply. The motor 44 of FIG. 4 includes six transitions 64 per revolution.

Referring again to FIG. 3, the transitions 64 or pulses 60 of the motor 44 are amplified and filtered by an amplifier and filter 45. A comparator 46 discriminates different levels of the detected signal, and determines when the transitions occur as the motor 44 rotates from one winding to the next winding. A time domain filter 47 is a time delayed filter that ensures that the velocity of the rotors 50 stay within a prescribed window.

The amplifier and filter 45, comparator 46, and time domain filter 47 are components of a back EMF encoder according to a specific embodiment. A pulse counter 48 counts the number of pulses or transitions to produce the position data without the need for a separate position encoder.

Figure 7:
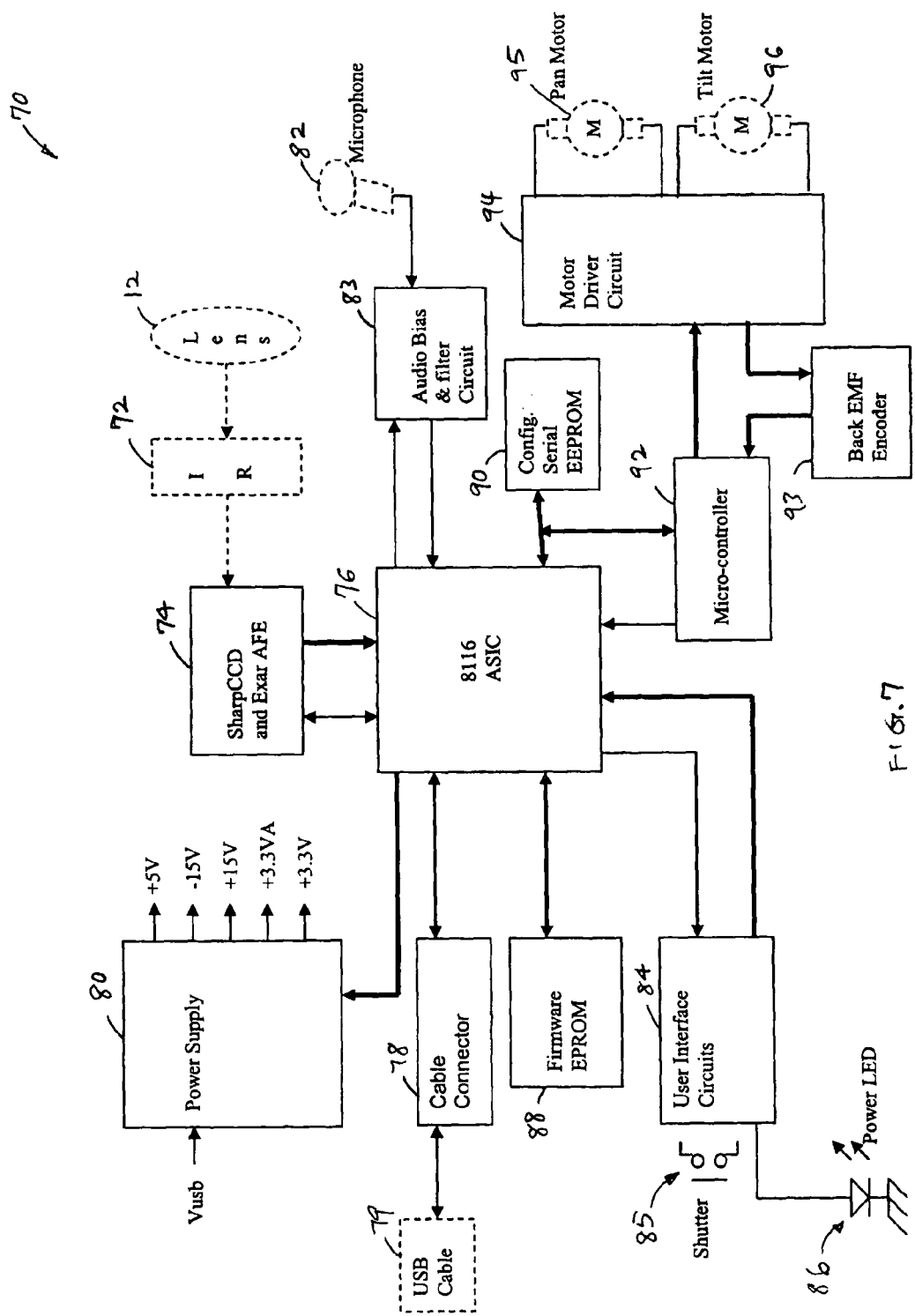
FIG. 7 is a block diagram of the system for the pan and tilt camera according to an embodiment of the present invention.

FIG. 7 shows the overall system 70 for the pan and tilt camera according to an embodiment of the present invention. Video signals are received through the lens 12 and passed through an IR filter 72 to an image sensor 74 which may be in the form of a sharp CCD and Exar AFE. The signal is provided to a processor 76, such as an application specific integrated circuit (ASIC), which outputs the video signal via a cable connector 78 to a USB cable 79 or the like. A power supply 80 receives the power from a USB cable connected to a computer or the like, as shown in FIGS. 1 and 2. Audio signals are received through the microphone 82 and processed by the audio bias and filter circuit 83. The ASIC 76 digitizes the audio signals, and creates packets from the audio signals and output them to the cable connector 78. The ASIC 76 is coupled to user interface circuits 84 for processing signals from a shutter 85, which may be manually activated by a snapshot button provided on the camera. The user interface circuits 84 may also provide switch or LED control, for instance, of a power LED 86 to indicate that the camera is in recording mode.

The firmware EPROM 88 includes computer codes for operating the ASIC 76. The configuration serial EEPROM 90 allows the setting of switches or the like to customize the system 70 to the specific requirements of the specific application or a particular customer. The pan and tilt camera movement is carried out by micro-controller 92, back EMF encoder 93, and motor drive circuit 94, which control the pan motor 95 for panning the camera housing 14 and the tilt motor 96 for tilting the camera lens 12. The operation of these components has been described in connection with FIG. 3.

The pan motor 95 will drive the camera housing 14 within a certain range of pan movement (e.g., about 140 degrees). Limit switches may be used to signal the end of travel when the camera housing 14 reaches the boundaries of the 140° in pan movement. Alternatively, the system can determine that the end of travel has been reached if no signal is received from the pan motor 95 for a preset period of time (e.g., 100 ms), indicating that the pan motor 95 has stopped at one of the two boundaries of the 140° range of pan movement and cannot go any further.

Figure 8:
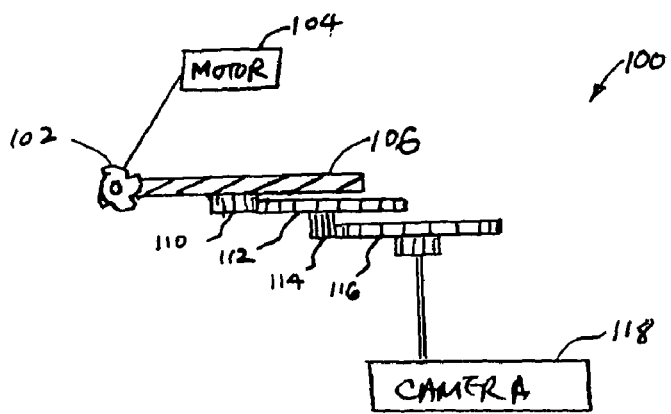
FIG. 8 is a simplified diagram of the gear system in the actuating mechanism for the camera according to an embodiment of the invention.

FIG. 8 shows a gear system 100 disposed between the pan motor 95 and the camera housing 14 or between the tilt motor 96 and the camera lens 12. The gear system 100 reduces the speed of rotation and multiplies of torque applied to the camera components. The gear system 100 is also configured to reduce the noise produced so as not to minimize the effects on the audio component of the camera 10. As seen in FIG. 8, the first reduction employs a worm gear 102 driven by a motor 104 to turn a worm wheel 106 in the first reduction stage. A spur gear 110 mounted to or integrally formed with the worm wheel 106 turns a spur wheel 112 in the second reduction stage. Another spur gear 114 mounted to or integrally formed with the spur wheel 112 turns another spur wheel 116, which is coupled to the camera 118 to turn the camera lens 12 in tilt or the camera housing 14 in pan.

The first reduction stage typically produces the most vibration and noise due to the high speed of rotation. The use of the worm gear coupling instead of a spur gear coupling lowers the noise substantially. At the high rotational speed of the DC motor (e.g., 15,000-20,000 rpm) the teeth of spur gears will hit each other since they are not in continuous contact with each other. This creates acoustic noise and mechanical vibrations. Worm gears, on the other hand, remain in contact and tend to glide relative to each other instead of hitting each other in rotation. In one example, the motor 104 rotates at about 20,000 rpm, and the gear system 100 produces a reduction of 684.8 to 1. The gearbox that houses the gear system 100 may be made of plastic to reduce weight.

Figure 9:
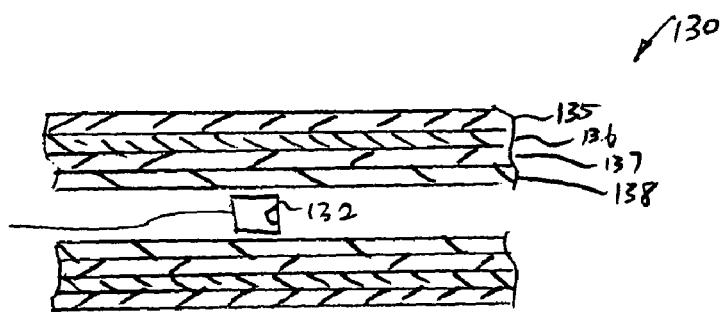
FIG. 9 is a cross-sectional view of a noise reduction device employing sandwiched materials for the audio member of the camera according to an embodiment of the invention.

In addition to reducing the noise and vibration produced by the motors and gears inside the camera housing 14 of the camera 10 in FIGS. 1 and 2, a noise reduction mechanism is desirably used to isolate acoustically the microphone or the like in the base 18. In this way, the audio can be captured during a pan or tilt motion without significant degradation of its quality. In one embodiment as illustrated in FIG. 9, a sandwiched structure 130 is used to surround the acoustic member such as a microphone 132 inside the camera base 18. The sandwiched structure 130 includes multiple layers of different materials, 135, 136, 137, 138, which may include metal, plastic, rubber, etc. At each interface between adjacent layers, a part of the energy traveling through the sandwiched structure 130 is reflected due to the difference in material properties such as elasticity.

Figure 10:
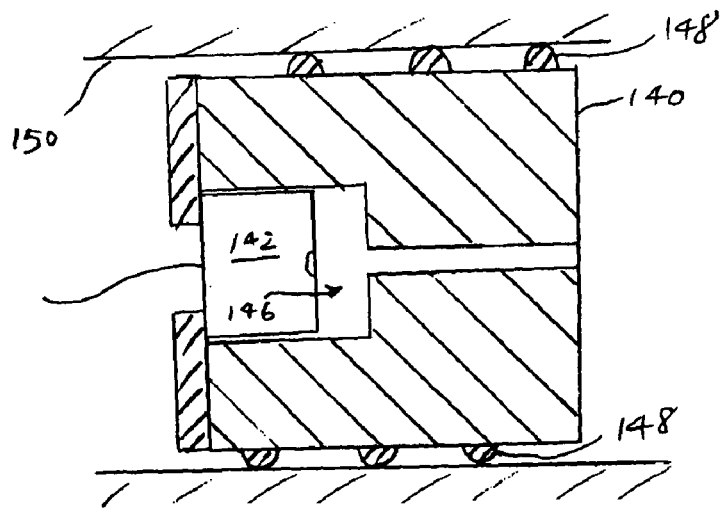
FIG. 10 is a cross-sectional view of a noise reduction device made of an absorption material for the audio member of the camera according to another embodiment of the invention.

In another embodiment as illustrated in FIG. 10, an absorption material is used to form an acoustic insulation housing 140 around the microphone 142. The absorption material is typically a polymer or elastomer. In a specific embodiment, the absorption material is a shock absorption material such as neoprene, Sorobothane, or EAR's C1002, and the insulation housing 140 is formed by molding. The insulation housing 140 may include two halves that are hinged together, and can be closed after an audio member such as a microphone is placed inside the cavity 146. The external surface of the housing 140 desirably includes knurls or spacers 148 disposed between the housing 140 and the shell 150 of the camera base 18. The knurls 148 serve as mechanical isolators that limit the contact area between the insulation housing 140 and the camera base 18, thereby reducing the transfer of vibration to the insulation housing 140, especially high frequency vibration.

Figure 11:
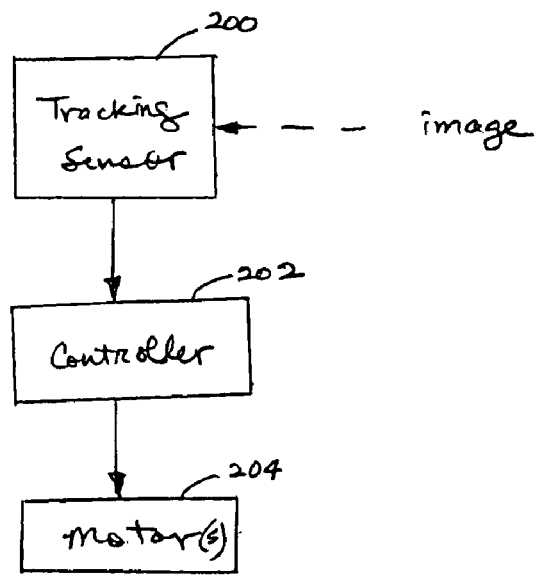
FIG. 11 is a simplified block diagram of the face tracking components of the camera according to an embodiment of the present invention.

In the exemplary embodiment as shown in FIG. 11, the camera 10 includes a face tracking feature. When activated, a face tracking sensor 200 enables the camera to sense movement of the face of a subject and the controller 202 tracks the movement with the pan and/or tilt motion provided by the motor(s) 204 in the camera housing 14. The controller 202 may be the motor control circuit 94 of FIG. 7. Face tracking may be achieved by one or more schemes implemented in software including, for example, identifying and tracking features of a face (eyes, nose, mouth, etc.), sensing and tracking movement of a subject already being captured or monitored by the sensor 200, sensing human skin tone and tracking movement thereof, and the like. When the camera housing 14 is in motion, it will take some time and distance to stop due to the inertia. The "braking" distance and time will depend on the speed of the camera housing 14. It is desirable to control the motor(s) 204 to avoid overshooting during face tracking. It is noted that the software for face tracking, controlling pan and tilt motion, or the like may reside in the camera device (typically as firmware) or the host device.

Figure 12:
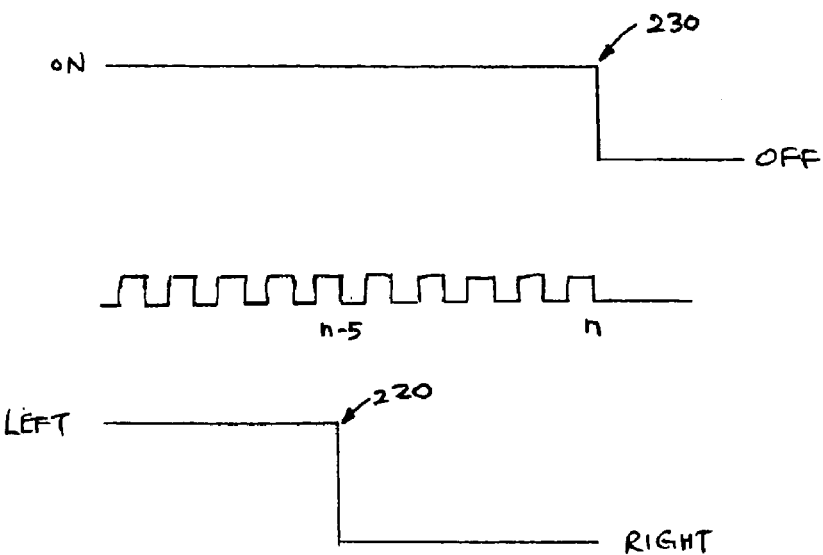
FIG. 12 is a graph illustrating a braking scheme for the motor actuating the camera movement.

FIG. 12 is a graph illustrating a braking scheme for the motor actuating the camera movement either in pan or in tilt. Based on the tracking sensor 200, the controller 202 takes the degrees of movement required and calculates the number (n) of time steps or pulses the motor 204 will take to achieve the tracking movement, taking into consideration the gear reduction ratio. According to the braking scheme, the motor 204 is to reverse the direction or polarity at a preset number of time steps before the nth step. For instance, the controller 202 will direct the motor 204 to reverse polarity at n-5th step (e.g., changing from LEFT to RIGHT in panning motion), as illustrated by the step change 220 in FIG. 12. The motor 204 stops at the nth step, as indicated by the step change 230 from the on position to the off position. In this way, the camera will stop at substantially the same location as the subject being tracked to avoid or minimize overshooting the target position.

During initial boot-up, the pan motor 95 and tilt motor 96 move the camera to ascertain the permissible ranges of movement, and the limit switches measure the boundaries of the permissible ranges of movement to provide pan limit positions and tilt limit positions. In the exemplary embodiment, the movement of the camera in pan and tilt is controlled by measuring relative displacements instead of absolute positions. The measurement data may be used to determine the absolute coordinate positions of the camera movements. In a specific embodiment, the measurement data is obtained by the camera 10 and provided to the host device 30 for processing to determine the absolute coordinates. For example, the system can determine a reset position which is a center position disposed substantially equidistant between the pan limit positions and substantially equidistant between the tilt limit positions. The camera may be moved to the reset position after initial boot-up. Alternatively, the system may be programmed or configured to allow a user to set a home position so that the camera will automatically move to the home position after initial boot-up. The home position may be set with respect to the reset position, or with respect to the pan limit positions and tilt limit positions.

A calibration scheme may be used to increase the system position accuracy. A calibration offset for positioning the camera lens is determined and stored. During operation of the camera lens in pan and tilt, the calibration offset is used as a correction to control movement of the camera lens. The calibration offset corrects errors for positioning the camera lens due to production imperfections or the like. The calibration offset may be a correction for manufacturing error which is determined during manufacturing. The calibration offset can be stored in memory and then automatically applied after initial boot-up to ensure precise and accurate position control of the camera lens during use. The calibration offset may be determined and applied with respect to the pan limit positions and tilt limit positions.

The above-described arrangements of apparatus and methods are merely illustrative of applications of the principles of this invention and many other embodiments and modifications may be made without departing from the spirit and scope of the invention as defined in the claims. The scope of the invention should, therefore, be determined not with reference to the above description, but instead should be determined with reference to the appended claims along with their full scope of equivalents.

What is claimed is:

1. A camera comprising:
 a camera housing;
 a camera lens rotatably disposed in the camera housing and disposed to rotate with respect to the camera housing,
 a camera support coupled to the camera housing, wherein the camera housing is rotatably disposed on the camera support;
 a DC motor having a plurality of rotors and coupled with the camera lens to pan the camera lens along with the camera housing relative to the camera support or tilt the camera lens relative to the camera housing;
 a sensor configured to track a subject;
 a controller coupled with the DC motor to control the DC motor and to the sensor to receive position information of the subject being tracked;
 a back EMF encoder coupled with the DC motor and configured to detect pulses from rotations of the rotors; and
 a pulse counter coupled to the back EMF encoder and configured to count the pulses detected by the back EMF encoder and determine from the count a number of rotations of the rotors;
 wherein the controller is configured to control movement of the DC motor based on the position information received from the sensor, the position information including a target position at which the subject stops, and the number of rotations; and
 wherein the controller is configured to reverse a polarity of the DC motor before the camera lens reaches the target position to slow movement of the camera lens and avoid overshooting the target position.

2. The camera of claim 1 wherein the controller is configured to reverse the polarity of the DC motor at least five pulses before the camera lens reaches the target position.

3. The camera of claim 1 wherein the sensor detects a degree of movement of the subject from a start position to the target position, and wherein the controller is configured to calculate a total number of pulses for the DC motor to move the camera lens from the start position to the target position.

4. The camera of claim 1 wherein the controller includes a constant current control to regulate an energy supplied to the DC motor.

5. A camera comprising:
 a camera housing;
 a camera lens rotatably disposed in the camera housing and configured to rotate with respect to the camera housing;
 a DC motor having a plurality of rotors and coupled to the camera lens to tilt the camera lens relative to the camera housing;
 a sensor configured to track a subject;
 a controller coupled with the DC motor to control the DC motor and to the sensor to receive position information of the subject being tracked;
 a back EMF encoder coupled with the DC motor and configured to detect pulses from rotations of the rotors; and
 a pulse counter coupled to the back EMF encoder and configured to count the pulses detected by the back EMF encoder and determine from the count a number of rotations of the rotors;
 wherein the controller is configured to control movement of the DC motor based on the position information received from the sensor, the position information including a target position at which the subject stops, and the number of rotations; and
 wherein the controller is configured to reverse a polarity of the DC motor before the camera lens reaches the target position to slow movement of the camera lens and avoid overshooting the target position.

6. The camera of claim 5, further comprising a camera support rotationally coupled to the camera housing and configured to support the camera housing, wherein the DC motor is coupled to the camera support and the camera housing to pan the camera lens and the camera housing relative to the camera support.

7. The camera of claim 5, wherein the controller is configured to reverse the polarity of the DC motor at least five pulses before the camera lens reaches the target position.

8. The camera of claim 5, wherein the sensor detects a degree of movement of the subject from a start position to the target position, and wherein the controller is configured to calculate a total number of pulses for the DC motor to move the camera lens from the start position to the target position.

9. The camera of claim 5, wherein the controller includes a constant current control to regulate an energy supplied to the DC motor.

10. A camera comprising:

a camera housing;

a camera lens rotatably disposed in the camera housing and configured to rotate with respect to the camera housing, a camera support coupled to the camera housing, wherein the camera housing is rotatably disposed on the camera support;

a DC motor having a plurality of rotors and coupled with the camera lens to pan the camera lens along with the camera housing relative to the camera support and tilt the camera lens relative to the camera housing;

a sensor configured to track a subject;

a controller coupled with the DC motor to control the DC motor and to the sensor to receive position information of the subject being tracked;

a back EMF encoder coupled with the DC motor and configured to detect pulses from rotations of the rotors; and a pulse counter coupled to the back EMF encoder and configured to count the pulses detected by the back EMF encoder and determine from the count a number of rotations of the rotors;

wherein the controller is configured to control movement of the DC motor based on the position information received from the sensor, the position information including a target position at which the subject stops, and the number of rotations; and wherein the controller is configured to reverse a polarity of the DC motor before the camera lens reaches the target position to slow movement of the camera lens and avoid overshooting the target position.

11. The camera of claim 10, wherein the controller is configured to reverse the polarity of the DC motor at least five pulses before the camera lens reaches the target position.

12. The camera of claim 10, wherein the sensor detects a degree of movement of the subject from a start position to the target position, and wherein the controller is configured to calculate a total number of pulses for the DC motor to move the camera lens from the start position to the target position.

13. The camera of claim 10, wherein the controller includes a constant current control to regulate an energy supplied to the DC motor.

* * * * *